United States Patent [19]
Roof

[11] 4,249,118
[45] Feb. 3, 1981

[54] CONTROL SYSTEM FOR MULTIPLE SPEED MOTOR

[75] Inventor: Richard W. Roof, West Columbia, S.C.

[73] Assignee: Square D Company, Palatine, Ill.

[21] Appl. No.: 69,653

[22] Filed: Aug. 27, 1979

[51] Int. Cl.³ .............................................. G05P 5/00
[52] U.S. Cl. .................................. 318/305; 318/422; 318/484
[58] Field of Search ............... 318/305, 306, 308, 301, 318/384, 386, 404, 421, 422, 446, 420, 484, 443, 444, 490; 307/141, 141.4, 141.8; 340/309.1, 309.4, 309.6, 309.5

[56] References Cited

U.S. PATENT DOCUMENTS

| | | | |
|---|---|---|---|
| 2,186,254 | 1/1940 | Manke | 318/305 |
| 3,068,390 | 12/1962 | Lichtenfels et al. | 318/422 X |
| 3,299,338 | 1/1967 | Torii | 318/404 X |
| 3,943,421 | 3/1976 | Shibata et al. | 318/305 X |

Primary Examiner—Ulysses Weldon
Attorney, Agent, or Firm—Michael J. Femal

[57] ABSTRACT

A control system for a multiple speed motor includes a motor circuit having a plurality of resistance varying units in series with the field winding and armature of the motor and separate control circuits for each of the resistance varying units. Each control circuit includes an energizable contactor in series with a gating element and a timer for activating the gating element. The control system includes an activating circuit for bypassing the timer when the level of current flow in the motor circuit is below a certain value. The activating circuit includes a comparator for receiving a reference signal and a signal indicating the level of current flow in the motor circuit and produces an output signal when the current flow is below a certain value which is fed to an OR-gate that also receives a signal from the timer to activate the gating element when either signal is present.

13 Claims, 3 Drawing Figures

CONTROL SYSTEM FOR MULTIPLE SPEED MOTOR

TECHNICAL FIELD

The present invention relates generally to control systems for motors and, more specifically, to a system for controlling the speed of a D.C. motor.

BACKGROUND PRIOR ART

In control systems for controlling the speed of D.C. motors, it has become customary to provide multiple speed settings for the motor and to provide a fixed time delay between shifting from one speed point to another. This allows time for the motor to accelerate and develop sufficient counter E.M.F. to thereby limit the current to an acceptable maximum value to prevent destruction of the components in the circuit and the motor.

One type of control system that has been utilized for this purpose includes a plurality of acceleration resistors that are placed in series with the armature of the DC motor. A plurality of normally open contacts are respectively placed in parallel with each of the acceleration resistors so that the resistors can be bypassed sequentially by closure of the respective contacts.

The respective contacts are usually enclosed by separate circuits having contactor coils located therein and a time module is also placed in series with each contactor coil. Thus, energization of a contactor coil circuit by moving a master switch from a previous control step to the next control step will delay the energization of the contactor coil for a predetermined fixed time period, called an anticipation delay. After the setting of the time delay has expired, the timer module completes the circuit to the contactor coil to allow closure of the associated set of contacts to bypass the associated resistor and increase the speed of the motor.

One type of time module that can be utilized for this purpose consists of a resistor-capacitor exponential curve and a programmable unijunction transistor voltage comparator (hereinafter called P.U.T.). Upon expiration of the anticipated delay period, the P.U.T. provides a current pulse to the gate of a gating element such as a silicon controlled rectifier (hereinafter called S.C.R.). If the master switch for the DC motor controller is then moved or advanced to the next speed setting or control step, the acceleration contactor coil energization is again delayed by the next timer module for its predetermined fixed time.

The design criteria utilized for establishing the resistance, as well as the time delay, is usually calculated based upon a maximum load and speed for the load, as well as the intermediate motor loads and speeds.

In many areas of operation, the anticipated delay is disadvantageous when the operator is performing functions at less than maximum load and unnecessary if the motor has completed acceleration before advancing to the next step of acceleration. For example, if the operator is raising and lowering less than maximum loads, it is desirable to advance the speed setting to the next typical speed without awaiting the time delay incorporated into the above type of circuit. In other instances, the operator may be switching between control speed steps for the motor in rapid succession to produce a "jogging" sequence. When a jogging sequence is utilized in the existing control circuit, the operator must anticipate the time delay incorporated into the system when the speed is set to the next higher speed setting because the timer is not activated until the master switch is advanced to the next higher speed.

One type of control system that, to some degree, alleviates the above problem is disclosed in co-pending application Ser. No. 040,806, filed May 21, 1979, for a Pre-Step Timer Circuit for DC Motor Control. The solution disclosed in this application consists of placing a sensing resistor module between the line side of an accelerator contactor coil of one speed control step to the load side of the accelerating coil contacting coil and to the input of a timer module in series therewith in a subsequent speed control step. Thus, when the first speed control step is activated, the resistor module will produce a feed forward path to the next timer to allow a small amount of current to flow through the resistor module to operate the next timer in a subsequent control step which permits the accelerating contactor coil of the subsequent control step to be actuated immediately when the master switch is advanced.

SUMMARY OF THE INVENTION

According to the present invention, the problem of the time delay is solved by utilizing a circuit which senses the current flowing through the armature of the motor at any given time and produces an output signal, which is compared to a reference signal that is then fed to a triggering circuit that forms part of the timer module so that subsequently activated circuit can be immediately completed in the event that the current flow to the motor is below a predetermined level. Thus, the variable time delay between speed points of a DC motor control circuit is dependent upon the current flow through the armature of the motor. A secondary circuit, incorporating fixed time delays similar to the previously mentioned control scheme is included in the control circuit to "force" the motor to accelerate to the next speed point in the event that the motor armature current does not drop below a pre-determined level in less than a pre-determined time.

More specifically, the control system for a multiple speed motor includes a motor circuit that is connectable to a voltage source and has an armature and a field winding in series with a plurality of resistant-varying means and normally open sets of contacts in parallel with the respective resistance varying means. A separate control circuit is provided for each normally open set of contacts, with each control circuit having an energizable contactor coil to close an associated set of contacts. Each control circuit has a time delay means associated therewith in series with the energizable contactor coil, with the time delay means including a timer and a gating element.

According to the primary aspect of the invention, the current through the motor circuit is sensed and is fed to a comparator, which also receives a reference signal and produces an output signal when the reference signal is greater than the current through the motor circuit. The output signal is then fed to each of the time delay means to bypass the time delay means when an output signal is present.

In the specific embodiment illustrated, the effective current through the motor circuit is measured by measuring the voltage drop across the last step of the potential or resistance-varying means and is directly proportional to the current that passes through the motor with the means for producing a reference signal being fed to the comparator along with the voltage drop or potential across the last step of the potential or resistance varying means and an output signal is produced when the current through the motor circuit, more specifically the armature of the motor, is less than the reference signal.

Stated another way, the invention provides for means for maintaining the current level through the armature of a motor having a plurality of speed settings below a predetermined maximum value of either providing a time delay means in the actuating circuit for each of the potential or resistance-varying means and, alternatively, sensing the current flow through the motor and bypassing the time delay means when the current or potential value is below the desired maximum.

DETAILED DESCRIPTION

Figure 1:
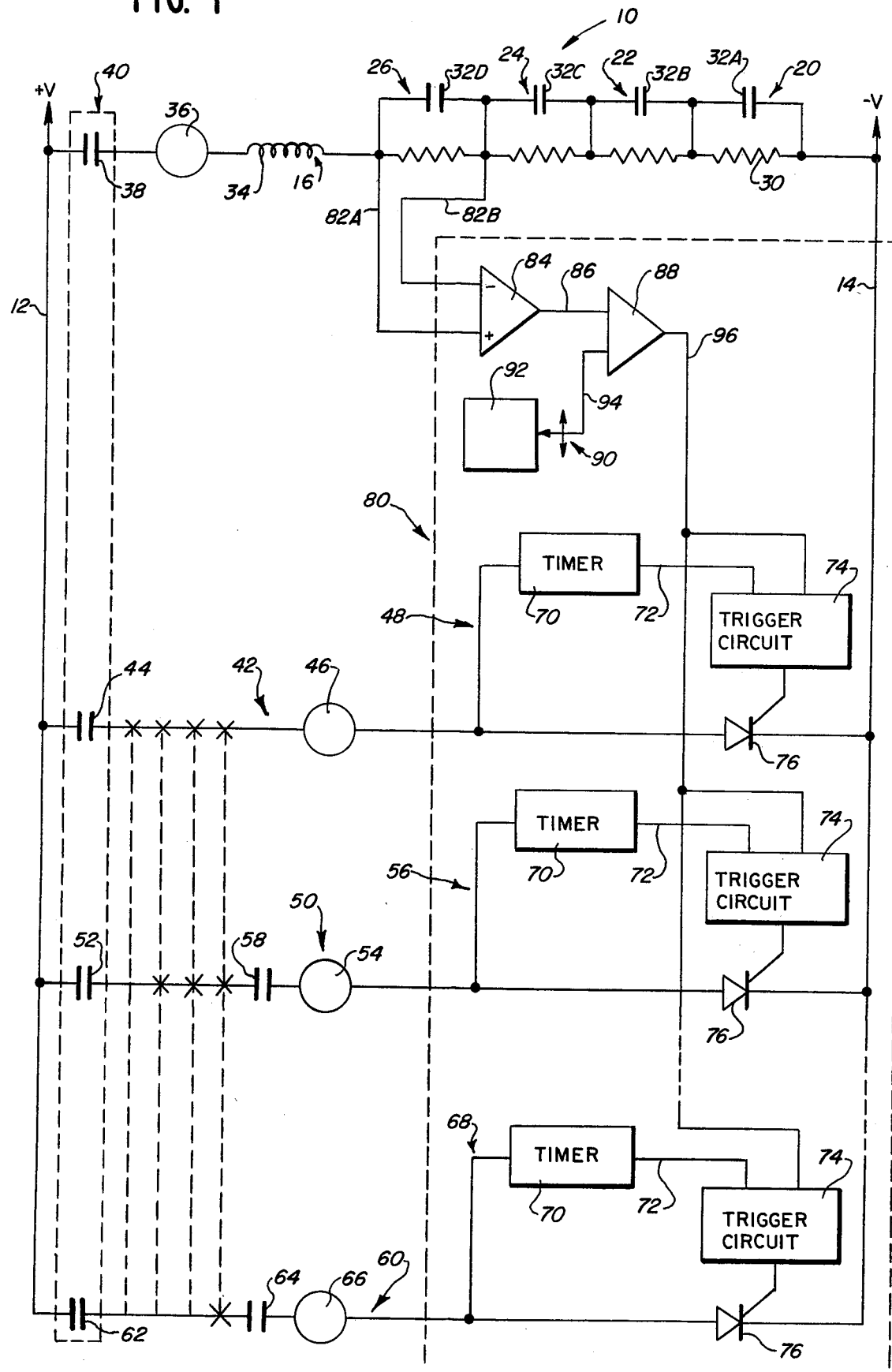
FIG. 1 is a partial schematic wiring diagram of a typical crane-hoist control circuit for DC motors having the present invention incorporated therein.

While this invention is susceptible of embodiment in many different forms, there is shown in the drawings, and will herein be described in detail, a preferred embodiment of the invention, with the understanding that the present disclosure is to be considered as an exemplification of the principles of the invention and is not intended to limit the invention to the embodiment illustrated.

FIG. 1 is the drawings schematically illustrates a crane-hoist control circuit generally designated by the reference numeral 10. Control circuit 10 includes a source of potential or voltage indicated by a +V line 12 and −V line 14 with a motor circuit 16 interposed between lines 12 and 14. Motor circuit 16 includes a plurality of potential varying means or accelerator resistors 20, 22, 24 and 26. Each potential or resistance-varying means consists of a resistor 30 and a set of normally open contacts 32 in parallel therewith.

In addition to the plurality of resistors 30 that are located in series with each other, the motor circuit 16 also includes the field winding 34 of a DC motor and an armature 36 in series therewith along with a set of normally open contacts 38 of a master switch 40. In the illustrated embodiment, four sets of resistance varying means are illustrated and the normally open contacts for the respective resistance -varying means are identified as contacts 32A-D. A separate control circuit is provided for each set of normally open contacts and three of the four control circuits (42, 50, 60) are illustrated in the drawings. A first control circuit 42 consists of a set of normally open contacts 44, located in series with an acceleration contactor coil 46, which, in turn, is in series with a time delay means 48. The second control circuit 50, which is substantially identical to control circuit 42, again includes a set of normally open contacts 52 in master switch 40, an acceleration contactor coil 54, and a further time delay means 56, along with set of normally open contacts 58 actuated by the first control circuit 42. A fourth control circuit 60 again consists of a set of normally open contacts 62 in master switch 40, a set of normally open contacts 64 actuated by the third control circuit (not shown), an accelerator contactor coil 66 and a time delay means 68.

The respective time delay means 48, 56 and 68 are incorporated in the respective circuits to provide a predetermined time delay for operation of a next successive resistance-varying means for a predetermined time period after a previous resistance-varying means has been actuated. More specifically, each time delay means consists of a timer 70 that has an output line 72 connected through a triggering mechanism 74 (to be described later) to a gating element or S.C.R. 76.

With the circuits so far described, the motor for the hoist control circuit is capable of being operated at five different speed settings by initially closing contacts 38 which provides the lowest speed setting for the motor and then sequentially actuating the four resistance-varying means 20, 22, 24 and 26 successively.

Assuming now that the operator wishes to increase the speed of the motor from the first speed point or speed setting to the second speed setting or control step, the master switch is moved to a second position wherein contacts 44 are closed. Initial closure of contacts 44 will energize timer 70 and S.C.R. gate 76 will remain opened until the timer has "timed out", after which the timer will complete a circuit to coil 46 and will result in closure of contacts 32A in resistance varying means 20 to bypass the first resistor 30 and reduce the resistance in the circuit with the armature 36. The time delay incorporated into circuit 42, sometimes called anticipation delay, permits the motor to accelerate at the previous speed setting or speed point and develop a given amount of torque to overcome the inertia of the motor and the load thereon before the speed of the motor is changed by the operating advancing the master switch to the next speed point. This time delay means or time module 48 prevents any current or torque peak that could damage the motor as the operator advances the master switch from one speed point to the next higher speed point.

At the same time contacts 32A are closed in motor circuit 16, contacts 58 in the next control circuit 52 are closed to condition this circuit for activation when the master switch contacts 52 are closed.

As indicated above, the respective time delay means 48, 56 and 68 are incorporated into the circuit to act as a current limiting device for the motor in the event that master switch 40 is moved from a null position wherein all of the master switch contacts for the respective control circuits are simultaneously closed. Stated another way, if timer modules 48, 56 and 68 were not present and if the master switch were immediately moved to the fastest speed point of setting, all of the contacts would close and would result in a large surge of current through the motor armature 36 which could damage the motor. With the succesive time delay means incorporated therein, each speed point setting for the motor must remain energized for a predetermined time before the next speed setting or variable resistance means can be bypassed through closure of a switch.

However, in certain instances, it may be desirable to advance the speed setting at a more rapid rate than the circuit described above is capable of doing. For example, if the motor load is extremely low, or if there is no load on the hook associated with the crane-hoist motor, the operator may desire to more rapidly increase the speed to the maximum to reduce the time required for moving the hook from one extreme position to another.

According to the present invention, this is accomplished by a very simple addition to the control circuit that has previously been utilized in a crane-hoist control so that the time delay incorporated into each of the control circuits is automatically bypassed in the event that the current through the motor armature circuit drops below a certain maximum value.

More specifically, as illustrated in FIG. 1 of the drawings, the control system 10 incorporates an activating circuit 80 which is capable of activating the S.C.R. or gating element 76 directly in response to the current through the armature 36 of the motor.

More specifically, the activating circuit 80 consists of a means for sensing the current flow in motor circuit 16; that is, conductors 82A and 82B are connected to motor circuit 16 across the last variable-resistance means 26. The conductors 82A and 82B produce a signal indicating the current flow, more specifically, the voltage drop across the last step of the resistors in series with the armature 36 as a function of the current and this is fed into an operational amplifier 84 which is utilized for isolating the signal and has an output that is passed through conductor 86 to a comparator means 88.

Activating circuit 80 also includes means 90 for producing a reference signal and feeding the reference signal to comparator 88. The means for producing a reference signal is preferably in the form of a potentiometer 92 that has an adjustable output fed through a conductor 94 to comparator 88.

Comparator 88 then compares the signals received from conductors 86 and 94 and produces an output signal whenever the signal through conductor 86 is less than the reference signal from potentiometer 72. This output signal is then passed through a conductor 96 to a triggering circuit mechanism or OR-gate 74.

With this arrangement, the S.C.R. or gating element 76 can be activated either from a signal from comparator 88 or a signal from time delay element 70. Thus, if the current flow through the armature 36 is higher than a predetermined level set by adjustable means 90, the S.C.R. will be activated or triggered when the time for timer 70 has expired. Conversely the S.C.R. will automatically and immediately be triggered once the current flow in the motor circuit 16 is below a desired level.

In the illustrated embodiment, the output signal from comparator 88 is simultaneously fed to each of the triggering mechanisms 74 in each of the control circuits for the respective resistance-varying means 20–26. Thus, if the current flow in motor circuit 16 is below the desired maximum level, and any of the master switch contacts in the respective control circuits are closed, the associated circuit will immediately be completed through the particular acceleration contactor coil to close the set of contacts associated therewith.

In operation of the control system 10 with the present invention incorporated therein, the operator may turn master switch 40 to its first position wherein contacts 38 are closed to complete motor circuit 16 and have the motor operating at the lowest speed or set point since all of the resistors 30 are in series with the armature 36 at this time. If the operator then moves the master switch to a second position wherein contacts 44 are closed, time delay means 48 will be activated and begin the timing cycle or anticipated delay in energizing the first set of contacts 32A. In the event that the current flow in motor control circuit 16 is below a desired level, the time delay will be bypassed through the activating circuit 80 to immediately energize contactor coil 46 and close contacts 32A. Of course, energization of contactor coil 46 will also close contacts 58 in the second circuit and, if master contacts 52 in that circuit are closed at that time, the second time delay means 56 will again be energized. However, again, in the event that the current in motor circuit 16 is below a desired level or value, the timer 70 will be bypassed and the first S.C.R. 76 will immediately be closed.

Figure 2:
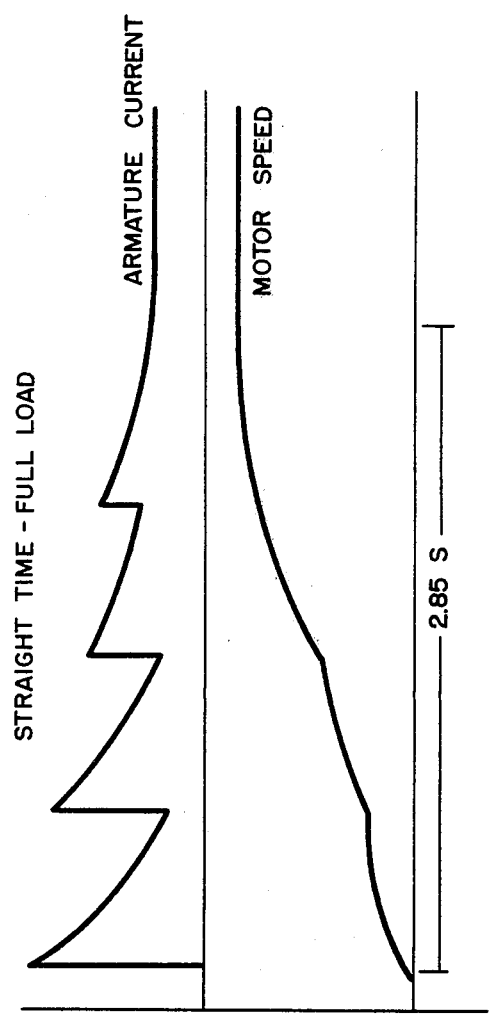
FIG. 2 is a graph showing the time-current-motor speed for a typical hoist control system without the present invention incorporated therein.
Figure 3:
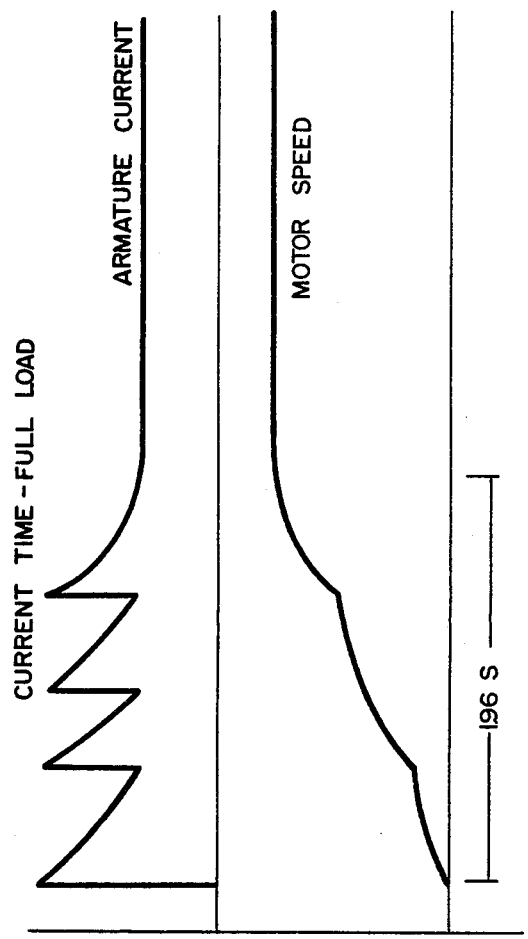
FIG. 3 is a graph similar to FIG. 2 showing the same time-current-motor speed with the present invention incorporated therein.

Referring now to FIGS. 2 and 3, the advantages of the present invention will become apparent. The graph shown in FIG. 2 of the drawings illustrate a typical time-current-motor speed relationship for a crane-hoist control circuit wherein a fixed time delay is included in each control circuit. The graph of FIG. 2 indicates what occurs in the event that the operator has a full load, such as a five ton load on a five ton crane-hoist, and moves the master switch from a neutral position to a full speed position for the motor wherein all of the contacts for the respective control circuits are simultaneously closed. The time delay means in the illustrated graph was set for 0.7 seconds for each of the timers in the respective four control circuits illustrated in FIG. 1 for activating the respective resistance-varying means in the motor circuits. This graph clearly illustrates that the time required to go from zero to maximum speed for the motor covers a time span of approximately 2.85 seconds.

Comparing the graph of FIG. 2 with that illustrated in FIG. 3, in which the same time delay was incorporated into each of the identical circuits as utilized for producing the graph in FIG. 2, the timer bypass feature of the present invention results in a substantial reduction in time on the order of more than 30% for going from a zero speed to a maximum speed for the hoist motor while still limiting the armature current peaks to a maximum value no greater than that of FIG. 2.

While any number of different components can be utilized, a specific type of component will now be described that has been operated successfully for producing the intended results. The master switch 40 could be a Square D Class 9004VM or CM master switch, while each of the accelerating contactors or contactor coils might be a Square D Class 7004 Type M contactor. Each of the timer modules connected in series with the respective contactors could be a Square D Class 8962 Type M solid-state timer. Also, the resistance modules 20, 22, 24 and 26 are preferably selected so as to be coordinated with consideration given to both crane load and speed, as well as motor load and speed.

Of course, numerous modifications came to mind without departing from the spirit of the present invention. For example, the control circuit could readily be designated to be strictly a current-sensitive control circuit wherein the output from comparator 88 could be fed in series to the respective OR-gates or trigger mechanisms so that the respective S.C.R. 76 in the respective control circuits would be energized in sequence.

What is claimed is:

1. A control system for a motor having a multiple speed setting, the system being connectable to a source of potential, comprising a motor circuit having a plurality of independently actuable potential varying means, a control circuit for each potential varying means, each control circuit including time delay means responsive to a previously energized control circuit for delaying operation thereof, means for producing a reference signal, means for comparing said reference signal with the effective potential across said motor circuit and producing an output signal when said reference signal is greater than the potential across said motor circuit, and means for supplying said output signal to said time delay means to bypass said time delay means when an output signal is present.

2. A control system as defined in claim 1, in which each time delay means includes a timer and an impedance element in each control circuit with said output signal supplied to each impedence element to bypass said timer.

3. A control system as defined in claim 2 in which each impedance element is a control relay energized by one of said timers and said output signal.

4. A control system as defined in claim 3 in which said means for supplying said output signal includes an Or-gate with said output signal and a timer signal supplied to said OR-gate and in which an output from said OR-gate is supplied to said control relay.

5. A control system as defined in claim 1, in which said independently actuable potential varying means include a plurality of resistors in said motor circuit in series with a field winding for said motor with means for measuring the voltage drop across said resistors as a function of current flow through said field winding and in which each control circuit includes a set of normally open contacts each in parallel with an associated resistor and contact closure means for closing said normally open contacts.

6. A control system for a motor having multiple speed settings, the system being connectable to a voltage source producing current flow, a motor circuit having an armature and field winding in series with a plurality of resistance-varying means and normally open sets of contacts in parallel with respective resistance-varying means, a control circuit for each normally open set of contacts with each control circuit having an energizable contactor to close an associated set of contacts, and a gating element in series with each control circuit, and an activating circuit including means for sensing the current flow in said motor circuit between said field winding and said resistance-varying means, means for producing a reference signal, means for comparing the sensed current flow with said reference signal and producing an output signal when said reference signal is greater than said sensed current flow, and means for activating said gating elements with said output signal.

7. A control system as defined in claim 6, in which said means for activating said gating elements simultaneously activates all of said gating elements.

8. A control system as defined in claim 6, in which said means for sensing the current flow includes means for sensing the voltage drop across said plurality of resistance-varying means as a function of the current flow.

9. A control system as defined in claim 6, 7 or 8, in which each control circuit includes a timer activated in response to energization of said control circuit and said means for activating the associated gating element includes an OR-gate receiving said output signal and an output signal from said timer for activating said gating element in said control circuit when either output signal is present.

10. A control system as defined in claim 6, further including means for adjusting said reference signal.

11. A method of controlling a motor having a plurality of speed settings including a source of voltage producing a current flow through a motor circuit having a plurality of current varying means, and an independent actuating circuit for each current varying means with each circuit having time delay means responsive to a previously energized actuating circuit for delaying actuation thereof, comprising the steps of producing a reference signal of a predetermined value, sensing the level of current flow through said motor circuit, comparing said level of current flow with said reference signal and producing an output signal when said reference signal is greater than said level of current flow and supplying said reference signal to each of said time delay means to render an energized time delay means inoperative when an output signal is present.

12. A method as defined in claim 11, in which said motor circuit has a plurality of resistors defining said current varying means in series with a field winding and armature for said motor and in which the level of current flow is sensed by measuring the voltage drop across said resistors as a function of current flow.

13. A method as defined in claim 12, in which each time delay means includes a timer producing an output after a predetermined time delay and a normally open gating element, the further step of feeding said output signal to an OR-gate and producing a closing signal for said gating element when either the output or output signal is present.

* * * * *

UNITED STATES PATENT AND TRADEMARK OFFICE
CERTIFICATE OF CORRECTION

PATENT NO. : 4,249,118

DATED : February 3, 1981

INVENTOR(S) : Richard W. Roof

It is certified that error appears in the above-identified patent and that said Letters Patent are hereby corrected as shown below:

Col. 1, line 55 "anticipated" should read -- anticipation --

Col. 3, line 9 "of" should read -- by --

Col. 4, line 34 "operating" should read -- operator --

Col. 4, line 53 "of" first occurrence should read -- or --.

Col. 6, line 54 "designated" should be -- designed --

Col. 8, line 44 "output" should read -- output and output signal --

Signed and Sealed this

Nineteenth Day of May 1981

[SEAL]

Attest:

RENE D. TEGTMEYER

Attesting Officer

Acting Commissioner of Patents and Trademarks